United States Patent [19]
Dodds

[11] Patent Number: 5,932,815
[45] Date of Patent: Aug. 3, 1999

[54] ANCHOR MONITORING SYSTEM

[76] Inventor: Donald J. Dodds, 543 N. Tomahawk Island Dr., Portland, Oreg. 97217-7923

[21] Appl. No.: 08/994,920

[22] Filed: Dec. 19, 1997

[51] Int. Cl.$^6$ .................................. G01L 1/26; G08B 1/00
[52] U.S. Cl. ........................................ 73/862.393; 340/531
[58] Field of Search ........................ 73/862.391, 862.393, 73/862.045, 862.454, 862.474, 862.08, 170.07, 170.11; 340/531, 539, 665, 668, 986, 529; 114/230.21, 294

[56] References Cited

U.S. PATENT DOCUMENTS

| | | | |
|---|---|---|---|
| 3,579,182 | 5/1971 | Schneider | 340/986 |
| 3,722,268 | 3/1973 | Crooke et al. | 73/862.393 |
| 3,727,212 | 4/1973 | Jones | 340/986 |
| 3,810,081 | 5/1974 | Rininger | 340/531 |
| 3,824,575 | 7/1974 | Rich, III | 340/529 |
| 3,911,387 | 10/1975 | Seabury, Jr. | 73/862.393 |
| 3,913,396 | 10/1975 | Elliot | 73/862.393 |
| 3,956,742 | 5/1976 | Karl | 73/862.393 |
| 4,055,137 | 10/1977 | Motai et al. | 73/862.393 |
| 4,258,566 | 3/1981 | Decker et al. | 73/862.393 |
| 4,651,139 | 3/1987 | Oettli | 73/862.393 |

*Primary Examiner*—Harshad Patel
*Assistant Examiner*—Robin C. Clark
*Attorney, Agent, or Firm*—Smith-Hill and Bedell

[57] ABSTRACT

A monitoring system measures the tensile load on a ship's rode (the cable, chain or rope connecting the ship to its anchor) and also measures the velocity and direction of the wind and the velocity of the current that produce the rode load. From those measured values, the system calculates wind and current resistance factors enabling it to model rode load as a function of wind and current velocity. When the behavior of the monitored rode load departs from the behavior predicted by the model in a manner that is symptomatic of a catastrophic or dragging anchor system failure, the anchor monitoring system signals an alarm. An alarm is also produced if the rode load approaches the tensile strength of the rode. The system also tests the anchor holding strength of the sea bed and provides anchor load information helpful to a skipper when motoring into the wind. The monitoring system senses rode load by using a load cell to laterally deflect the rode. The load cell includes a strain gauge generating an output signal that may be processed to determine the rode's, or any other lining like mooring lines, running rigging, etc., tensile load.

34 Claims, 9 Drawing Sheets

ANCHOR MONITORING SYSTEM

FIELD OF THE INVENTION

The present invention relates in general to ship anchoring systems and in particular to a system for monitoring performance of a ship's anchoring system and for producing usable data and alarms when the anchoring system fails.

DESCRIPTION OF RELATED ART

A ship's anchoring system suffers a "catastrophic" failure when the "rode" (e.g. rope, chain or cable) connecting the ship to the anchor breaks or when the anchor completely dislodges from the sea bed. An anchoring system suffers a "dragging" failure when the anchor drags through the sea bed without firmly lodging in the sea bed. Mooring systems can suffer similar failures. Since there may be no immediately noticeable effect when an anchor or mooring system fails, a ship's crew may not be aware that their ship is adrift. Since a drifting ship poses a danger, it would be desirable to supply the crew with information regarding the anchor holding strength of the sea bed, the loads due to wind and current, and provide a means for alerting the crew when the ship's anchor or mooring system fails.

Several previous anchor or mooring monitoring systems alert the crew when the tension in an anchor rode or mooring line becomes too high. U.S. Pat. No. 3,810,081 issued May 7, 1974 to Paul Rininger describes an anchor monitoring system employing a sensor attached to the rode for producing a signal indicating the angle of the rode from which tensile load in the rode is determined. An alarm is sounded when the rode load approaches a predetermined level. This system is problematic because it is troublesome to attach a sensor to the rode after the anchor is lowered, and it is difficult to raise and lower an anchor with a sensor attached to the rode without damaging the sensor or its signal cables. Also since rode angle is not highly sensitive to changes in load the system does not provide an accurate measurement of rode tension.

U.S. Pat. No. 3,913,396 issued Oct. 21, 1975 to George Elliot describes a monitoring system which alarms when a strain gauge attached between a mooring line and a mooring indicates excessive rode tension. Elliot's system would be inconvenient for monitoring an anchoring system because, since it requires that the strain gauge be attached between the rode and the ship, the strain gauge would have to be installed after the anchor has been lowered.

Neither the Rininger nor the Elliot systems alarm when the anchor or mooring system actually suffers a catastrophic or dragging failure. They warn when rode load is above a predetermined limit, but since that limit is set below a level at which a failure is likely to occur, most alarms will be false alarms. Also, catastrophic and dragging failures can sometimes occur at relatively low rode loads. In these cases, the Rininger and Elliot systems would fail to sound an alarm.

U.S. Pat. No. 4,651,139 issued Mar. 17, 1987 to Martin Oettli describes a monitoring system which alarms when a boat actually drifts. A piezoelectric accelerometer fixed to the anchor signals when the anchor is pulled over the sea floor. An electrical signal cable delivers the signal from the accelerometer on the anchor to alarm electronics in the ship. However, as Oettli indicates, a complex mechanism is needed to separate the signal cable from the rode as the anchor is being lowered or raised so that the cable will not be damaged. Also a long signal cable that can withstand stressful conditions is expensive.

The holding power of an anchoring system depends in large degree on the nature of the material of the sea bottom in which it is lodged. None of the systems described in the above-mentioned patents measure the holding strength of an anchor system for the type of sea bottom in which the ship is to be anchored. Thus such systems do not provide the ship's crew with information that would help them select the most effective anchor when more than one anchor is available.

What is needed is a reliable and easy to use anchor monitoring system that not only determines when an anchor system has failed but which also provides information on the anchor holding strength of the sea bottom as well as the actual loads on the system.

SUMMARY OF THE INVENTION

For a ship at anchor, an anchor monitoring system in accordance with the present invention digitizes the output signals of sensors monitoring rode load, current velocity, wind velocity, wind direction and sea floor depth and supplies the result as input data to a computer. The computer uses the digitized data as basis for determining and displaying the tested holding strength of an anchoring system including the sea bed and also for alarming when the anchor system has failed or is about to fail.

In accordance with one aspect of the invention, the load on a ship's rode is measured with a load cell containing a strain gauge. The load cell is not actively attached to the rode, but merely deflects it such that any load on the rode produces a proportional strain in the load cell. The strain gauge produces a signal representing the strain the rode places on the load cell, and also representing the rode load. Since the rode load sensor is not firmly attached to the rode—but merely deflects the rode while allowing it to move freely—the load sensor can be used to monitor rode load regardless of whether the rode is fully or partially played out. In some embodiments the load cell need not be removed when the anchor is raised or lowered. Also since the load cell is not a part of the anchor system it can not itself be the cause of an anchor system failure.

In accordance with another aspect of the invention, with the anchor in place in the sea bed and with the ship's engines pulling at maximum force against the anchor, the anchor monitoring system uses the load cell output as a means to determine anchor holding strength of the ship's anchoring system in situ. The computer displays the measured holding strength and allows the ship's skipper to define that tested holding strength, or some level below that, as an "alert" level above which the anchor monitoring system looks for anchor failures.

In accordance with yet another aspect of the invention, the computer also uses digitized sensor data to predict loads that the ship will place on the rode under various combinations of wind and current forces on the ship. The computer signals an anchor system failure alarm when the measured rode deviates from predicted rode load in a manner that indicates an anchor system failure or when the load approaches the strength of any system components. When a catastrophic anchor failure occurs under windy conditions, the actual rode load, as indicated by the digitized load sensor signal, falls to a level far below its expected value for the measured wind and current velocities. Thus, when the measured rode load rises above the alert level and then suddenly drops to a low level, the computer signals that a catastrophic failure has occurred. When a dragging failure occurs rode load also falls below its expected value, though it remains somewhat higher than that caused by a catastrophic failure since viscosity of the sea bottom material resists the anchor as it drags through the sea bottom. When the computer sees that the rode load is falling significantly despite increase in wind or current, the computer signals that a dragging failure has occurred. Thus the present invention not only alarms on detection of a catastrophic or dragging failure, it produces a separate alarm for each type of failure.

It is accordingly an object of the invention to provide a means for sensing the load on a line without actively attaching a sensor to the line.

It is another object of the invention to provide an effective means for bottom testing, by determining the rode load a sea bed can withstand with a particular type system and weight of anchor.

It is a further object of the invention to provide a means for sensing and alarming anchor system failures.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

FIGS. 4–10 are flow charts for programming the computer of FIG. 2, FIGS. 11 and 12 are plan and sectional elevation views of a first embodiment of a rode load sensor in accordance with the present invention.

DESCRIPTION OF THE PREFERRED EMBODIMENT(S)

Figure 1:
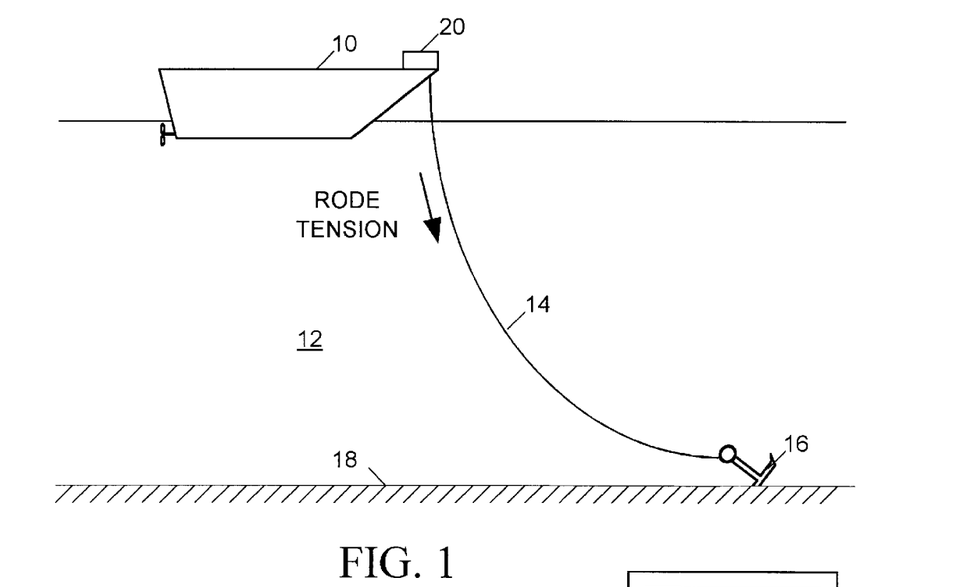
FIG. 1 illustrates a ship at sea connected through a rode to an anchor embedded in a sea floor.

FIG. 1 illustrates a ship 10 at sea 12 connected through a rode 14 (e.g., chain, cable or rope) to an anchor 16 embedded in a sea floor 18. A horizontal component of tension in rode 14 opposes lateral forces on the anchored ship 10 tending to push ship 10 away from anchor 16. Wind provides one such lateral force on ship 10. The amount of force the wind applies on ship 10 is a function of the wind's velocity and the surface area of the ship perpendicular to wind direction. Waves, surges and currents pushing on the ship's hull provide further lateral forces on ship 10, with the amount of those forces being a function of water velocity and the surface area of the underwater portion of the hull of ship i that is perpendicular to the direction of water flow.

When wind or water forces on anchored ship 10 become higher than the strength of any component of the ship's anchoring system, the ship's anchoring system can fail. An anchoring system has a "catastrophic" failure when rode 14 breaks or detaches from ship 10 or from anchor 16, or when anchor 16 completely dislodges from sea bed 18. When a catastrophic failure occurs, the load on rode 14 quickly drops from a high level to a very low level. An anchoring system may also experience a "dragging" (or "plastic") failure when sea bed 18 is not sufficiently firm to hold anchor 16 in place and the anchor drags though a viscous sea bed. When a dragging failure occurs, load in rode 14 drops, but typically does not drop as precipitously as in a catastrophic failure because an anchor 16 dragging through sea bed 18 continues to provide some opposition to movement of ship 10.

The present invention relates to an anchor monitoring system for alarming when the anchor system has had either a catastrophic failure or a dragging failure. Through a calibration process, the anchor monitoring system calculates wind and current resistance factors through by which it can compute a predicted rode load as a function of wind velocity, wind direction and current velocity. Thereafter, the monitoring system compares actual rode tensions to the predicted rode tension to determine whether the anchoring system has had a catastrophic or dragging failure. The ship's crew can also use the anchor monitoring system to determine the tested holding power of an anchoring system. This helps the crew to select the best anchor for the sea bottom to which the ship is to be anchored. The anchor monitoring system also is capable of comparing the actual rode load to the calculated tensile strength of the rode and producing an alarm when that limit is approached.

Figure 2:
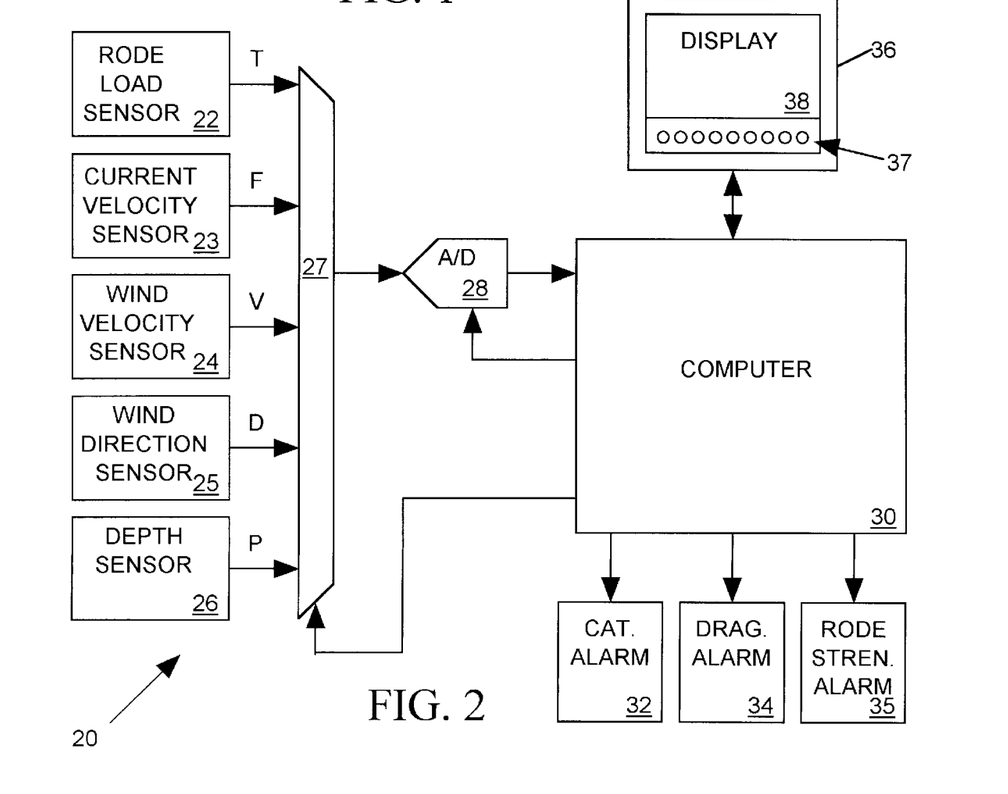
FIG. 2 illustrates an anchor monitoring system in accordance with the present invention in block diagram form.

FIG. 2 illustrates the anchor monitoring system 20 in block diagram form. A rode load sensor 22 in accordance with the present invention produces an output signal T indicating the load on rode 14 of FIG. 1. A conventional current velocity sensor 23 produces an output signal F indicating the velocity (flow rate) of water as it passes ship 10. A conventional wind velocity sensor 24 provides an output signal V indicating current wind velocity. A conventional wind direction sensor 25 generates an output signal D indicating wind direction relative to the ship's axis, and a depth sensor 26 produces an output signal P indicating sea floor depth. A multiplexer 27 selectively provides the analog output signal of any one of sensors 22–26 to a conventional analog-to-digital (A/D) converter 28. A/D converter 28 converts the magnitude of its input analog signal to a digital data value and provides it as input to a computer 30. Computer 30, which controls the input signal selection of multiplexer 27 and timing of input signal sampling by A/D converter 28, periodically acquires data representing rode load T, current velocity F, wind speed V, wind direction D and sea floor depth P from A/D converter 28 and uses that data to determine the ship's wind and current resistance factors, to determine the holding strength of the sea bottom and to determine when to signal a catastrophic alarm 32, a dragging alarm 34, or a rode strength alarm 35. Monitoring system 20 also includes a control panel 36 including a set of push buttons and control knobs 37 for providing user input to computer 30 and an LCD display 38 controlled by computer 30.

Dragging Failure Detection

Figure 3:
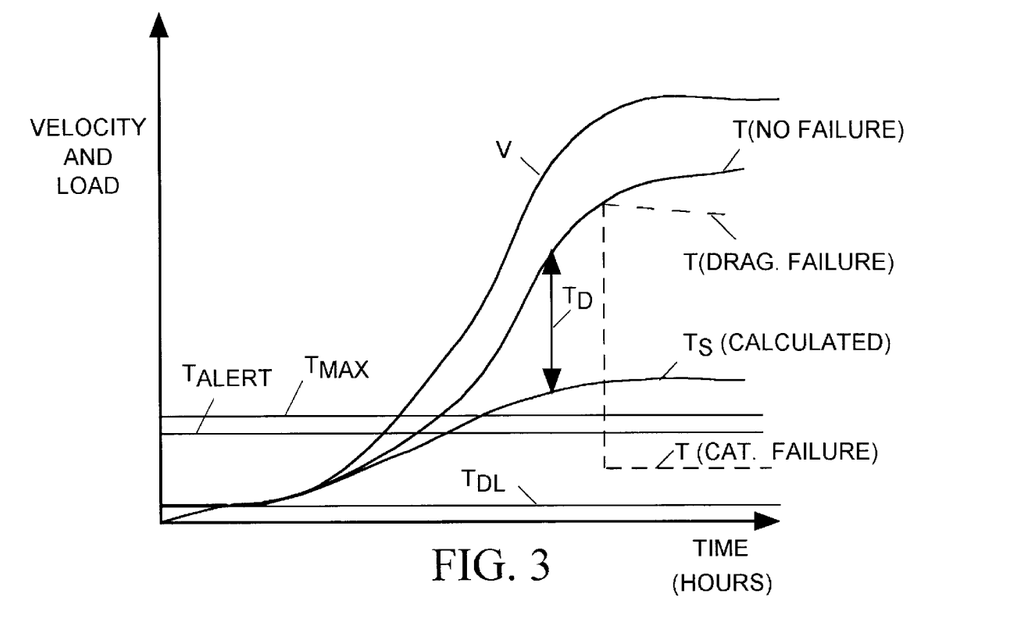
FIG. 3 is a timing diagram illustrating relationships between wind velocity and various loads on a rode as wind velocity rises over a span of a few hours.

FIG. 3 illustrates relationships (not to scale) between wind velocity and various loads on rode 14 as wind velocity V rises steadily from 0 to a high level over a span of a few hours where current velocity F is constant. Referring to FIGS. 1–3, load sensor 22 produces an output signal indicating total load T on rode 14. Computer 30 assumes that in the absence of an anchor failure, the total rode load T is the sum of a "static" load component $T_S$ and a "dynamic" load component $T_D$:

$$T = T_S + T_D \quad [1]$$

Relatively strong forces on ship 10 from surges and waves produce the dynamic load $T_D$. The changing lateral forces on ship 10 from wind ($T_W$) and currents ($T_C$) and from the dead load of rode 14 ($T_{DL}$) provide the static load $T_S$:

$$T_S = T_W + T_C + T_{DL}$$

or $$T_S = R_W(D)V^2 + R_C F^2 + T_{DL} \quad [2]$$

where $$T_W = R_W(D)V^2$$

and $$T_C = R_C F^2$$

In the above relations the constant $R_W(D)$ is a "wind resistance factor" that depends largely on the surface area and shape of the ship perpendicular to wind direction D. The constant $R_C$ is a "current resistance factor" that depends largely on the shape and area of the ship's hull. Thus if computer 30 knows the ship's wind resistance factor $R_W(D)$ for the present wind direction, the ship's current resistance factor $R_C$, and the rode's dead load $T_{DL}$, it can use equation [2] to compute the static load $T_S$ based on the wind velocity V measured by wind velocity sensor 24 and the current velocity F measured by current velocity sensor 23. It follows from equation [1] that computer 30 can then compute the dynamic rode load $T_D$ by subtracting the computed static load $T_S$ from total rode tension $T_D$ measured by the output of load sensor 22:

$$T_D = T - T_S \quad [3]$$

Normally when there is an increase in wind velocity, we would expect to see an increase in static load $T_S$ because the wind pushes harder on ship 10. The dynamic load $T_D$ may also increase with wind because the wind tends to increase wave action against ship 10. When increasing wind velocity V or current velocity F initiates a dragging failure, the actual static load on rode 14 will decrease because the anchor provides less opposition to ship movement. Since anchor 16 is dragging, the total rode load T measured by load sensor 22 will begin to fall. However the expected static load $T_S$ on rode 14 predicted by equation [2] will continue to increase with wind velocity V or current velocity F. As may be seen from equation [3], if expected static load $T_S$ is rising and the measured total load T is falling, then the calculated dynamic load $T_D$ will fall rapidly. Therefore if the dynamic load calculated in accordance with equation [3] falls while the static load predicted by equation [2] rises, we have a symptom of a dragging failure. Accordingly one might consider programming computer 30 to signal dragging alarm 34 when it detects a decrease in calculated dynamic load $T_D$ calculated in accordance with equation [3] with a concurrent increase in static load $T_S$ calculated in accordance with equation [2]. In such case computer 30 would correctly signal a dragging alarm, provided it first smoothed or appropriately phase shifted the raw wind velocity and current velocity data to account for effects due to the ship's inertia.

In the presence of changing winds or currents, the ship's inertia causes a phase difference between the actual and calculated static loads with the amount of the phase shift being constant and related to the mass and area of ship 10. This phase shift can cause an anchor system that is not experiencing a dragging failure to exhibit the decrease in calculated dynamic load $T_D$ with a concurrent increase in calculated static load $T_S$ that is characteristic of a dragging failure unless the wind and current velocity data V and F upon which the computation $T_S$ is based are appropriately altered by phase shifting or smoothing.

One way to appropriately alter V and F is to use well known numerical analysis techniques to determine the constant phase shift between the static and/or dynamic loads determined and then to phase shift the raw wind and current velocity data V and F by those amounts before computing static load $T_S$ using equation [2]. This eliminates the phase shift between $T_S$ and $T_D$ calculated in accordance with equations [2] and [3]. The phase shift problem can also be resolved in part by using statistical methods to smooth or dampen the incoming wind and current velocity data V and F before calculating $T_S$ in accordance with equation [2]. For example we can smooth or dampen V, F and T by computing them as moving averages of the raw data. With the instantaneous values of wind and current velocity and total rode load being replaced with altered (smoothed or phase shifted) values $V_A$, $F_A$, and $T_A$, equations [2] and [3] can be rewritten as:

$$T_{SA} = R_W(D)V_A^2 + R_C F_A^2 + T_{DL} \quad [4]$$

$$T_{DA} = T_A - T_{SA} \quad [5]$$

where $T_{SA}$ and $T_{DA}$ are the calculated "altered" dynamic and static loads.

We can define $T_{DA}(t)$ as the calculated altered dynamic load at some sample time t based on the calculated altered wind velocity $V_A(t)$ calculated for sampling time t and the altered rode load $T_A(t)$ calculated for time t. Similarly, we can define $T_{DA}(t+1)$ as the calculated "altered" dynamic load at a next sampling time t+1 based on the calculated altered wind velocity $V_A(t+1)$ at time t+1 and the measured rode load $T_A(t+1)$ at time t+1. Then from equations [4] and [5] we have $$T_{DA}(t) = T_A(t) - R_W(D)V_A^{\ 2}(t) - R_C F_A^{\ 2}(t) - T_{DL} \quad [6]$$

$$T_{DA}(t+1) = T_A(t+1) - R_W(D)V_A^{\ 2}(t+1) - R_C F_A^{\ 2}(t+1) - T_{DL} \quad [7]$$

We program computer 30 to signal dragging alarm 34 when $$T_{DA}(t) > T_{DA}(t+1) + T_{SEN} \quad [8]$$

and $$T_{SA}(t+1) > T_{SA}(t) \quad [9]$$

where $T_{SA}(t+1)$ is the altered static load for time t+1 calculated per equation [4] and where $T_{SEN}$ is a user-adjustable "sensitivity" factor. Equations [8] and [9] indicate that when the calculated static load $T_{SA}$ based on altered wind velocity $V_A$ increases from time t to time t+1, computer 30 will not signal a dragging alarm unless calculated altered dynamic load $T_{DA}$ falls at least by sensitivity factor $T_{SEN}$.

Thus if $T_{SEN}$ is sufficiently large, computer 30 will not signal false dragging alarms. However if $T_{SEN}$ is too large computer 30 won't be able to detect dragging failures. An anchor that begins to drag slowly though a muddy sea bed can still produce considerable static load on the rode. With $T_{SEN}$ set too high, the drop in calculated altered dynamic load $T_{DA}$ that occurs when the anchor begins to drag won't be large enough to trigger a dragging alarm. Sensitivity factor $T_{SEN}$ is suitably a little larger than the normal variation in calculated altered static load $T_{SA}$. The amount of normal variation in $T_{SA}$ depends on several factors, including the inertia of ship 10, the amount of normal variation in the wind, and the amount of damping provided in the calculation of altered total rode load $T_A$ and altered wind velocity $V_A$. Computer 30 represents the relative amount of damping it uses when computing wind velocity $V_A$ on display 38 as a "damping factor" N ranging from 0 to 1 with high values of N representing greater amounts of damping.

The user adjusts the value of $T_{SEN}$ and the amount of damping factor N. As it displays current values of $T_{SEN}$ and N on LCD display 38, computer 30 also displays the instantaneous and altered values of wind velocity V and $V_A$ and the measured and altered values of total rode load T and $T_A$. During gusty weather the user may, while monitoring display 38, use one of the knobs 37 on panel 36 to set the damping factor N to a minimum value for which the displayed altered wind value $V_A$ changes only slightly in response to relatively large gusts of wind. The user also uses a control knob 37 to set the value of $T_{SEN}$ to a low value. Thereafter, whenever computer 30 falsely signals dragging alarm 34, the user may slowly increase $T_{SEN}$. When the user has increased the value of $T_{SEN}$ to an appropriate level, computer 30 will stop generating false alarms.

Catastrophic Failure Detection

When a catastrophic failure occurs, as when rode 14 of FIG. 1 breaks or when anchor 16 completely dislodges from sea bed 18, the calculated altered rode load $T_A$ falls to a low level reflecting only the dead load of the remaining portion anchor system and friction of the anchor, if still attached, on the sea bottom. This level is certainly below the calculated altered static load $T_{SA}$ less sensitivity factor $T_{SEN}$. Thus when computer 30 determines that the measured total rode load T has fallen to a sufficiently low level, suitably below a value $T_{CAT} = T_{SA} - T_{SEN}$, it signals a catastrophic alarm 32. However total rode load T can also fall to a low level when there is little or no wind pushing on ship 10. To avoid signaling false catastrophic alarms that would arise during calm conditions, computer 30 does not alarm for catastrophic failure unless it first detects that total rode load T has risen above a user-adjustable "alert load" $T_{AL}$, and then detects that rode load has thereafter fallen below $T_{CAT}$.

Wind Resistance Factor Computation

The wind resistance factor $R_W(D)$ employed in calculating static load depends on the shape and other aspects of the ship and also depends on the direction D of the wind relative to the ship's axis. The wind resistance factor is difficult to calculate from measurements of the ship and can change from time to time, for example as when a large object is placed on the ship's deck. However computer 30 automatically establishes a value for wind resistance factor $R_W(D)$ for each 5 degree increment of wind direction relative to the ship's axis based on the data it receives from sensors 22–25. Computer 30 automatically updates the resistance factor $R_W(D)$ whenever it changes.

If there is no current flow F, then by combining and rearranging equations [1] and [2] above, and setting F to 0, we have $$R_W(D) = (T - T_{DL})/V^2 \quad [10]$$

Equation [10] suggests that when current velocity sensor 23 detects no current, computer 30 can compute $R_W(D)$ from measured values of rode tension T and wind velocity V when wind is blowing in direction D. Accordingly, computer 30 continuously samples V and T and, when current velocity sensor 23 indicates there is minimal current flow past ship 10, computes a value of $R_W(D)$ in accordance with equation [10]. Computer 30 stores in memory the last 100 computed values of $R_W(D)$ for each value of D. Upon computing a new value of $R_W(D)$ per equation [10], computer 30 replaces the longest stored value by the last computed value of $R_W(D)$. It then uses the 100 stored values of $R_W(D)$ to calculate the average (mean) value of $R_W(D)$. Computer 30 uses that average value for $R_W(D)$ when computing static load per equation [4]. Computer 30 also computes the standard deviation of the collection of 100 $R_W(D)$ values and signals the user via display 38 when the standard deviation is within acceptable limits, thereby providing an indication of its confidence in the assumed value of $R_W(D)$.

Current Resistance Factor Computation

When wind velocity sensor 24 indicates there is no wind, computer 30 computes and stores a sequence of 100 current resistance factors $R_C$. from successively measured rode load T and current flow rate F values in accordance with:

$$R_C = (T - T_{DL})/F^2 \quad [11]$$

The resulting set of current resistance factors $R_C$ are altered to produce the current resistance factor employed when computing static rode load. Computer 30 also computes the standard deviation of the collection of 100 $R_C$ values and signals the user via display 38 if the standard deviation is within acceptable limits, thereby providing an indication of its confidence in the assumed value of $R_C$.

In the preferred embodiment of the invention, the computed current resistance factor $R_C$ is not a function of current direction. However since current resistance factor is in fact a function of current direction relative to the ship's axis, $R_C$ can be more accurately computed as a function of current direction as is done for wind resistance factor $R_W(D)$. This would require a current direction sensor input to multiplexer 27. Computer 30 could then compute current resistance factor $R_C$ as a function of current direction in the same way that it computes wind resistance factor $R_W$ as a function of wind direction. However since wind forces are typically much more prominent factors in anchor failures than current forces, the improvement in alarm accuracy obtained by making current resistance direction-dependent is limited.

Dead Load Computation

In computing $R_W(D)$ or $R_C$ in accordance with equations [10] or [11], computer 30 employs a value for dead load of rode 14 $T_{DL}$ computed from information that the user provides, including the depth of the sea bed, the current scope (length) of the rode, and the type and diameter of the rode. Computer 30 maintains a lookup table indicating the weight per unit length of various rode types. Knowing rode weight and knowing the depth of the sea bed and the scope of the rode, computer 30 computes the dead load employing well-known catenary formulae.

Bottom Testing and Alert Loads

As mentioned above, when total rode load rises above an alert load $T_{ALERT}$ as illustrated in FIG. 3, computer 30 begins to monitor for catastrophic anchor failure. The alert load is determined by testing the anchor system and bottom material. The alert load is then set as a percentage of this test load using a control knob 37 on control panel 36. To test the strength of the bottom material, with anchor 14 in place, the user places computer 30 in a "load test" mode of operation in which computer 30 displays the rode load T and begins monitoring the rode load to determine a maximum rode load $T_{MAX}$ developed during the test. The ship's operator then puts the engine of ship 10 in full reverse to apply as much load as possible on rode 14. After the user signals computer 30 that the test is complete, computer 30 displays $T_{MAX}$. Using that value of $T_{MAX}$ and the calculated wind resistance factors for the boat, the computer also calculates and displays a wind velocity below which anchor failure is unlikely. Based on this displayed information, and based on local weather information, the user can determine the adequacy of the anchor system and plan appropriate action. At this point the user now knowing that the anchor system can withstand a load of at least $T_{MAX}$, may supply computer 30 with a suitable value for $T_{ALERT}$, for example, at 90% of $T_{MAX}$. This provides computer 30 with a load threshold below which anchor failure is unlikely.

Main Software Routine

Figure 4:
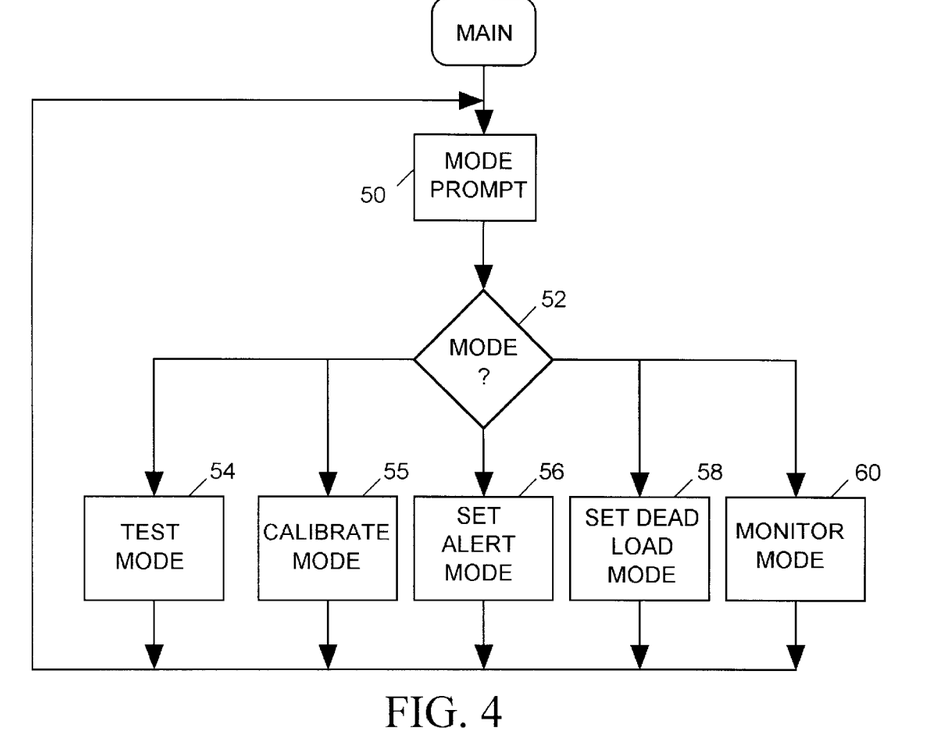

FIG. 4 is a flow chart for a main program for computer 30. On system startup, computer 30 prompts the user with a "MODE?" read out on LCD display 38 step (50) and then waits for the user to press one of a set of mode select buttons 37 on panel 36 (step 52). If the user selects a "test" mode, computer 30 executes a routine 54 in which it determines and displays the value of $T_{MAX}$. If the user selects a "calibrate" mode, computer 30 executes a routine 55 in which it calculates values of wind and current resistance factors $R_W(D)$ and $R_C$. If the user selects a "set alert" mode, computer 30 executes a routine 56 in which computer 30 obtains input data from the user indicating the alert load $T_{ALERT}$ that it is to use when monitoring the anchoring system. If the user selects a "set dead load" mode, computer 30 executes a routine 58 in which computer 30 calculates the dead load $T_{DL}$ on rode 14. Finally, if the user selects a monitor mode, computer 30 executes a routine 60 in which it monitors the anchoring system and also continuously updates the values of $R_W(D)$ and $R_C$. On return of any of routines 54–60, computer 30 reverts to step 50.

Test Mode Routine

Figure 5:
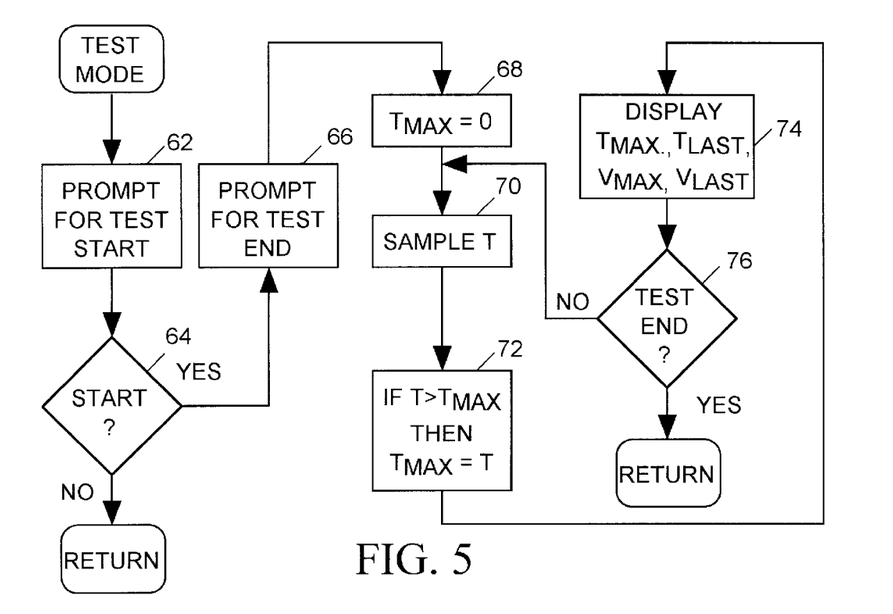

FIG. 5 illustrates the test mode routine 54 of FIG. 4 in flow chart form. Computer 30 initially prompts the user to press a start button 37 on panel 36 indicating that the user is ready to begin testing anchor system loading (step 62). Computer 30 then waits for the user's response (step 64). If the user presses a cancel button 37 on panel 36, the test mode returns to the main routine (FIG. 4). If the user indicates that the test is to start, computer 30 prompts the user to indicate when the test ends (step 66) and then sets the value of $T_{MAX}$ to 0 (step 68). Thereafter it samples the output of load sensor 22 of FIG. 2 to determine total rode load T (step 70). It then replaces the present value of $T_{MAX}$ with the last sampled value of T if T is greater than $T_{MAX}$ (step 72). Computer 30 then displays the maximum measured rode $T_{MAX}$, displays the last sampled rode load $T_{LAST}$ and calculates and displays wind velocities $V_{MAX}$ and $V_{LAST}$ that would produce the maximum and last measured rode loads (step 74), where $V_{MAX}=(T_{MAX}/R_W(D))^{1/2}$ and $V_{LAST}=(T_{LAST}/R_W(D))^{1/2}$. In the meantime the user runs the ship's engine in full reverse to load the rode to a maximum possible level. If the user has not indicated that the test is over (step 76), computer 30 reverts to step 70 to take another sample. The routine repeatedly loops through steps 70, 72, 74 and 76 until at step 76, computer 30 detects the user has indicated that the test is at an end. The test mode routine then returns to the main routine of FIG. 4.

Calibrate Mode Routine

Figures 6, 7:
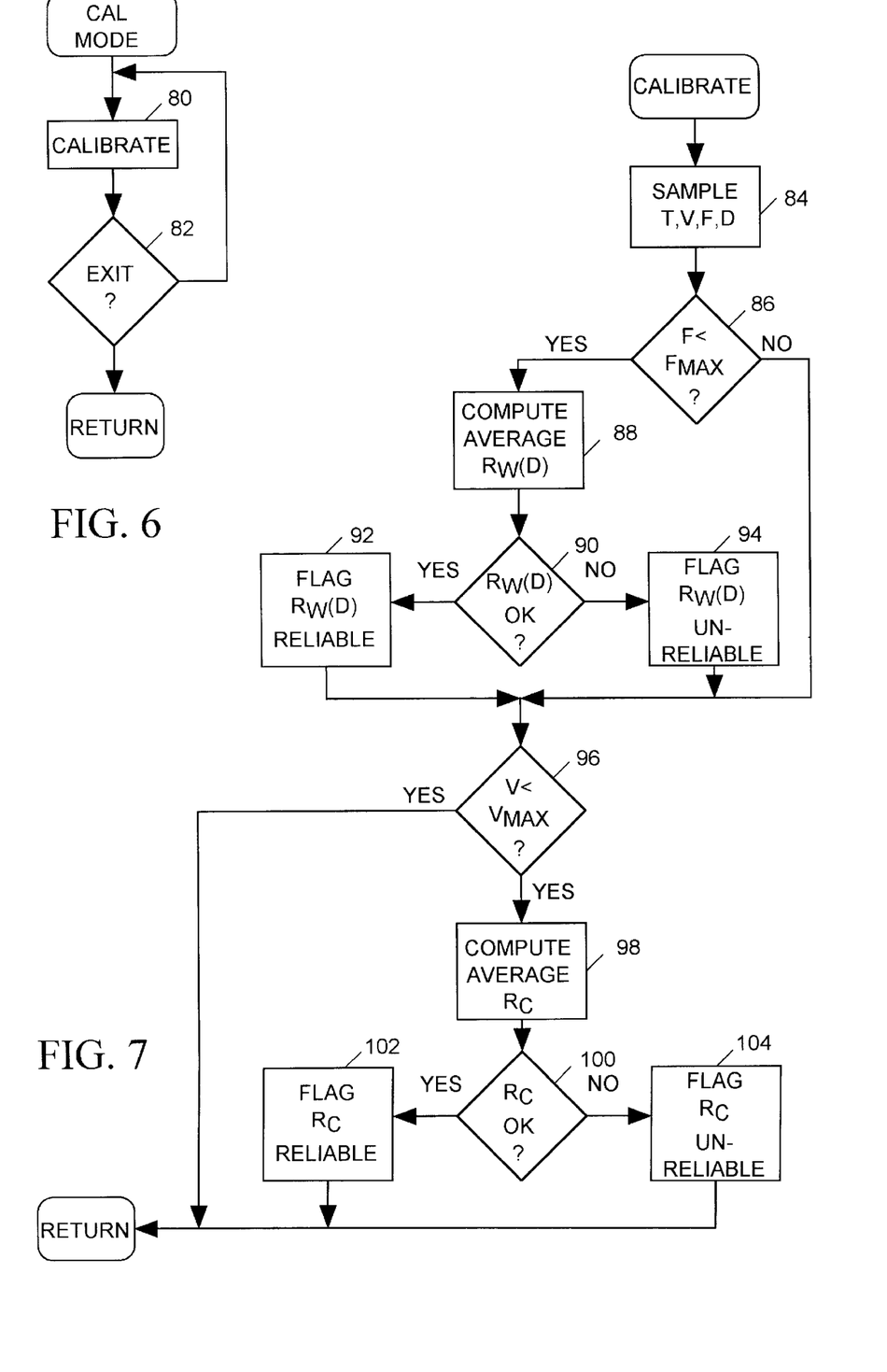

FIG. 6 illustrates the calibrate mode routine 55 of FIG. 4. Upon entering the calibrate mode, computer 30 executes a calibrate subroutine 80 (described below) in which it samples the T,V,F and D outputs of sensors 22–25 and updates values of $R_W(D)$ and $R_C$. Thereafter, if the user has pressed an "EXIT" button 37 on panel 36, the calibrate mode routine returns to step 50 of the main routine of FIG. 4 (step 82). However if the user has not pressed the EXIT button, the calibrate mode routine repeats calibration routine 80. Thus the calibration mode routine continuously recalculates and updates values of $R_W(D)$ and $R_C$ until the user presses the EXIT button.

Calibrate Subroutine

FIG. 7 illustrates calibrate subroutine 80 repeatedly called by the calibration mode routine of FIG. 6. When called, the calibrate subroutine first samples the T, V, F and D outputs of sensors 22–25 of FIG. 2 (step 84). It then determines whether the sampled current velocity F is less than a predetermined suitable small maximum velocity $F_{MAX}$ (step 86). If the current flow rate is smaller than $F_{MAX}$, then current is contributing relatively little to anchor load. In such case, computer 30 computes a value of $R_W(D)$ from the sampled T and V data, stores that value, and then averages that value with the last 100 stored values to produce an average value for $R_W(D)$ in the manner described above (step 88). Computer 30 then performs a standard deviation test on the collection of 100 stored computed $R_W(D)$ values (step 90). If the standard deviation is acceptably small, computer 30 produces a flag on display 38 indicating that the wind resistance factor calibration for the current wind direction is reliable (step 92). Otherwise computer 30 sets the flag on display 38 to indicate wind resistance factor calibration is unreliable (step 94).

After step 92 or 94, or after step 86 if F is not less than $F_{Max}$, computer 30 determines whether the sampled wind velocity is less than a predetermined small maximum $V_{MAX}$, suitably 1 Knot (step 96). If V is less than $V_{MAX}$, then computer 30 re-computes average current resistance factor $R_C$ in the manner described above (step 98), statistically checks reliability of the computed $R_C$ (step 100) and then either produces a flag on display 38 indicating $R_C$ is reliable (step 102) or indicating $R_C$ is unreliable (step 104). The calibrate routine returns to step 82 of the calibrate mode routine of FIG. 6 after step 96, if V is not less than $V_{MAX}$, or after step 102 or step 104.

Set Alert Mode

Figures 8, 9:
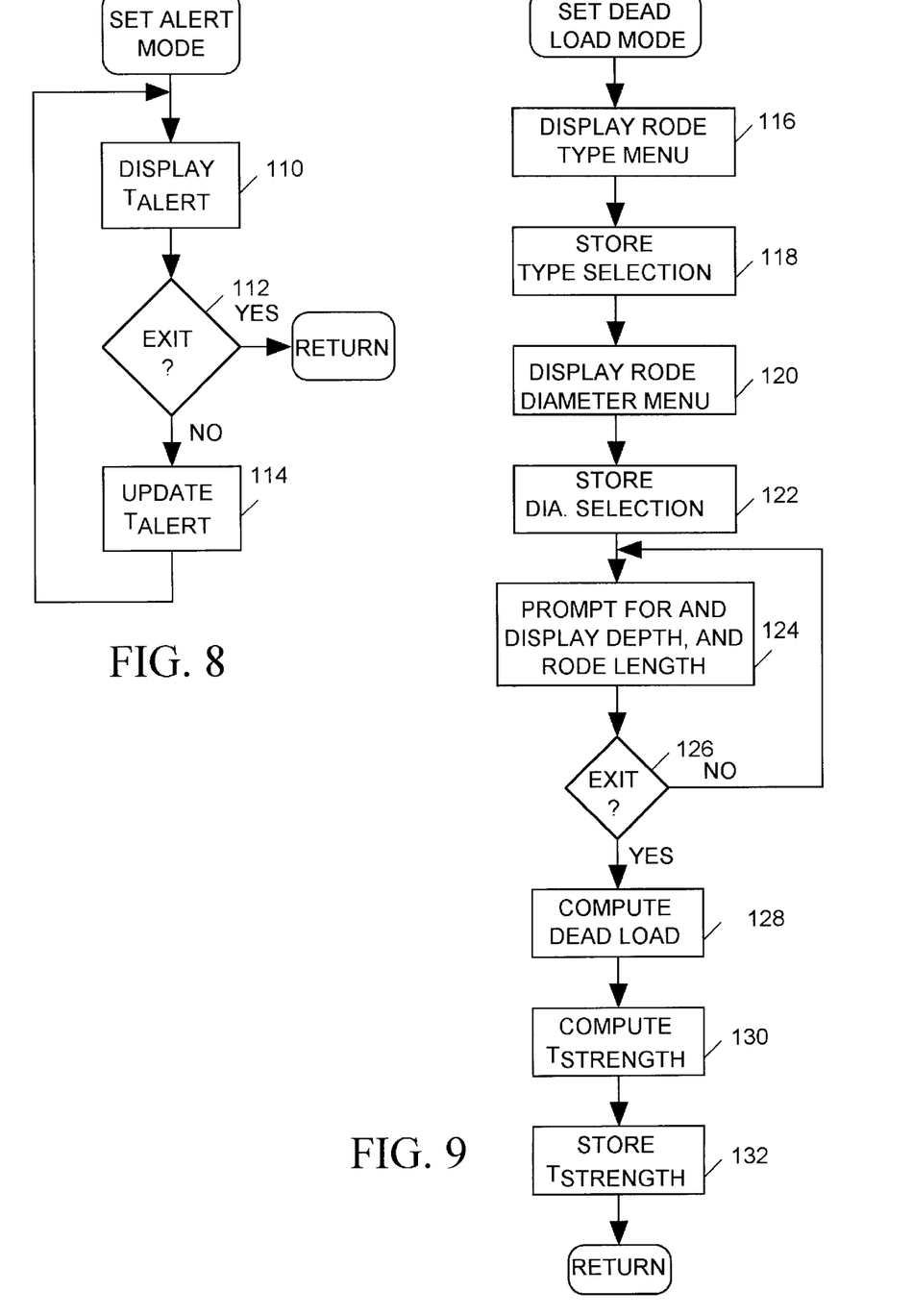

FIG. 8 illustrates the set alert mode routine 56 of FIG. 4. In this mode computer 30 displays the present alert load setting $T_{ALERT}$ (step 110), checks whether the user has pressed an EXIT button 37 (step 112) and if not updates the present value of $T_{ALERT}$ in response to any change in position of a control knob 37 (step 114) and returns to step 110 to update the display of $T_{ALERT}$. The set alert mode terminates and returns to the main routine when computer 30 detects the user has pressed the EXIT button at step 112.

Set Dead Load Mode

FIG. 9 illustrates the set dead load mode routine 58 called by the main routine of FIG. 4. Computer 30 initially displays a menu of rode types for which it stores information regarding rode weight per unit length (step 116). When the user selects one of the listed rodes from the menu using one of push buttons 37, computer 30 stores the rode type selection (step 118) and then displays a rode diameter menu (step 120). When the user selects a rode diameter using push buttons 37 (step 120), computer 30 stores the selected rode diameter (step 122), and then displays the present rode length and sea floor depth and prompts the user to adjust rode length and sea floor depth using one of knobs 37 (step 124). The computer calculates the tensile strength of the fode 14 ($T_{strength}$) using the rode type and diameter supplied by the user. If the user has not pressed an EXIT button 37 (step 126) computer 30 continues to repeat step 124. When the user presses the "EXIT" button, computer 30 computes the dead load from the new rode type, rode diameter, rode length and sea floor depth data using a well-known formula (step 128). The set dead load routine then returns to the main routine of FIG. 4.

Monitor Mode Routine

Figure 10:
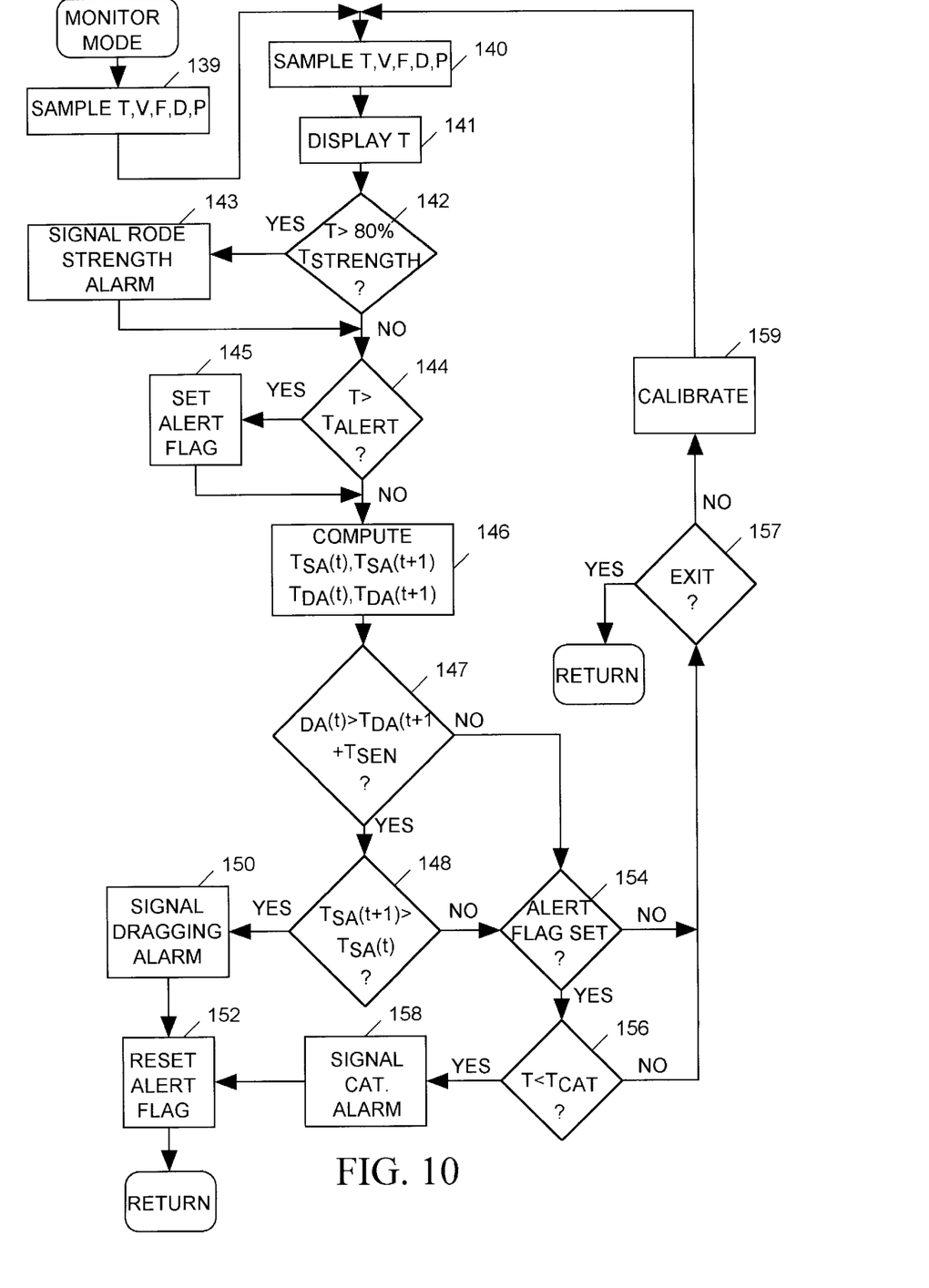

FIG. 10 illustrates the monitor mode routine 60 called in FIG. 4. In the monitor mode computer 30 monitors the outputs of sensors 22–26 of FIG. 2 and signals alarm 34 or 32 when it detects a dragging or catastrophic anchor failure, and signals alarm 35 when it detects high rode tension. Computer 30 also uses the data gathered from sensors 22–26 to continuously update the calibration of the wind and current resistance factors. Upon entering the monitor mode, computer 30 twice samples the T, V, F, P and D data outputs of sensors 22–26 (steps 139 and 140), and displays the measured rode tension T (step 141). It then compares rode tension T to 80% of the $T_{strength}$, value previously calculated (step 142). If T exceeds 80% $T_{strength}$, computer 30 signals rode strength alarm 35 of FIG. 2 (step 143). After step 142 or 143, computer 30 determines from the data sampled at step 140 whether total rode load T exceeds the alert level $T_{ALERT}$ (step 144). If so it sets an alert flag on display 38 of FIG. 2 (step 145). After step 145, or after step 144 if T is not greater than $T_{ALERT}$, computer 30 computes $T_{SA}(t)$, $T_{SA}(t+1)$, $T_{DA}(t)$, and $T_{DA}(t+1)$ in the manner described above from sensor data acquired at steps 139 and 140 (the two most recent sample times t and t+1) (step 146).

If $T_{DA}(t)$ exceeds $T_{DA}(t+1)+T_{SEN}$ (step 147) and if $T_{SA}(t+1)$ exceeds $T_{SA}(t)$ (step 148), computer 30 signals dragging alarm 34 of FIG. 2 (step 150), resets the alert flag (step 152) and returns to the main routine of FIG. 4. If $T_{DA}(t)$ does not exceed $T_{DA}(t+1)+T_{SEN}$ (step 146) or if $T_{SA}(t+1)$ does not exceed $T_{SA}(t)$ (step 148) then if the ALERT flag has been set (step 154), and if rode tension T is less than $T_{CAT}$ (step 156), then computer 30 signals catastrophic alarm 32 (step 158), resets the alert flag (step 152), and returns to the main routine.

If the alert flag is not set or if T is not less than $T_{CAT}$, and if the user has not pressed an EXIT button 37 (step 157), computer 30 executes the calibrate routine of FIG. 7 (step 159) to update average values of $R_W(D)$ and $R_C$ based on the sample data last acquired at step 140. The calibration routine then returns to step 140 of the monitor mode routine. At that point computer 30 acquires a next set of sensor data and repeats the process of testing for dragging catastrophic and rode failures once again. The monitor mode routine continues until computer 30 sounds an alarm at steps 143, 150 or 158 or until the user presses the exit button at step 157. Thereafter the monitor mode routine returns to the main routine of FIG. 4.

Motoring into the Wind

Under severe wind conditions ships at anchor can motor into the wind to reduce the load on the rode. However since it can be difficult for the ship's crew to know where the ship is in relation to its anchor, the ship can override the rode, wrap the rode around the propeller shaft and cut the rode with the ship's propeller or dislodge the anchor from the sea bed. The anchor monitoring system of the present invention helps the crew to avoid overriding the rode when motoring into the wind. As discussed above, when the monitoring system is the monitor mode (FIG. 10) it continuously measures and displays the rode load T (steps 140 and 141). When the ship's skipper motors into the wind, the skipper can monitor the displayed rode load and adjust the ship's throttle to keep the rode load below the measured maximum rode lode $T_{MAX}$ but above a selected minimum load. When the minimum load is selected to be sufficiently large, the ship continues to pull against the anchor and does not override the rode.

Rode Load Sensor—First Embodiment

Figure 11:
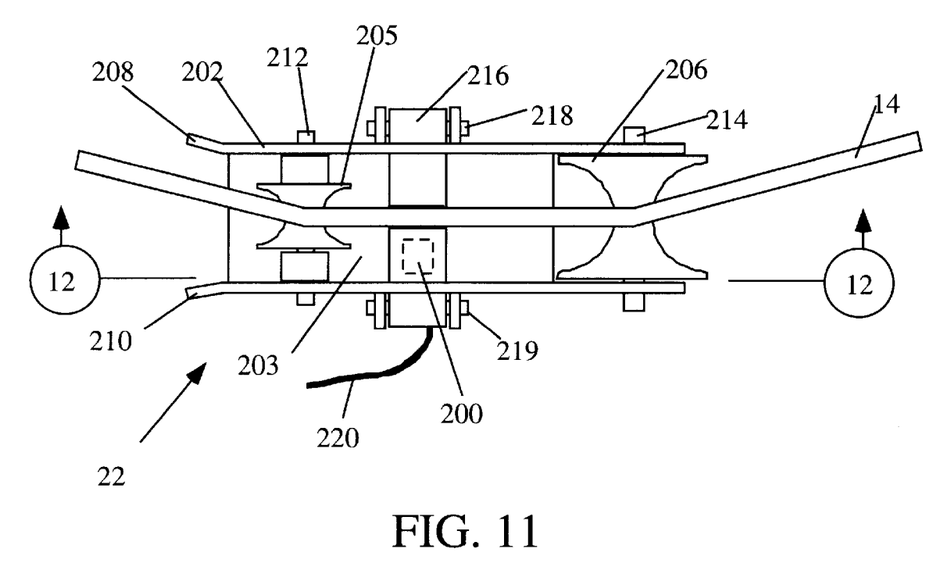
Figure 12:
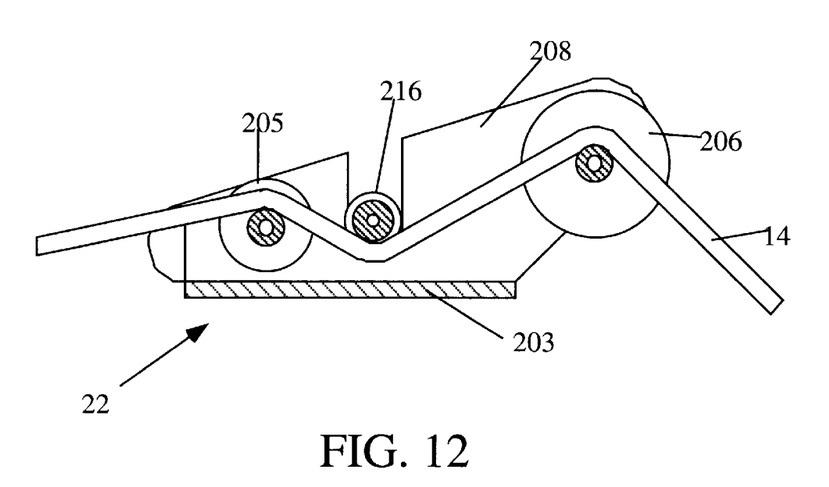

FIGS. 11 and 12 are plan and sectional elevation views, respectively, of a first embodiment of rode load sensor 22 of FIG. 2. Load sensor 22 includes a three-sided frame 202 having one side 203 attached to ship 10 of FIG. 1. A pair of guides 205,206 are mounted between opposing sides 208, 210 of frame 202 and attached thereto by pins 212,214. A cylindrical load cell 216 containing a strain gauge 200 is also mounted in frame 202 between guides 205, 206, with load cell 216 being attached to frame sides 208,210 by pins 218,219. Rode 14 passes through frame 202 over guides 205,206 and under load cell 216. Tensile forces acting on rode 14 produce an upward force on load cell 216 to which load cell 216 responds with an equal and opposite downward force on rode 14 in a direction substantially perpendicular to the tensile forces in rode 14. Strain gauge 200 senses a resulting strain in load cell 216 and provides an output signal representing that strain to multiplexer 27 of FIG. 2 via cable 220. Given the relationship between magnitude of the output signal of strain gauge 200, the angle defined by guides 205 and 206 and load cell 216, and the diameter of rode 14, a conversion ratio between magnitude of the strain gauge 200 output signal and rode load can be established and provided to computer 30 of FIG. 2. When sampling the digitized magnitude of the output signal of strain gauge 200, computer 30 converts the sample data to rode load T (for example in pounds or kilograms) using that conversion ratio. Since rode 14 is not attached to rode load sensor 22, rode 14 may be played out or retracted without removing it from sensor 22. Sensor 22 will operate correctly regardless of the length of rode 14 that has been extended from the ship. Rode 14 can be removed from sensor 22 by removing pin 218, rotating cell 216 on pin 219 and lifting up load cell 216.

Rode Load Sensor—Second Embodiment

Figure 13:
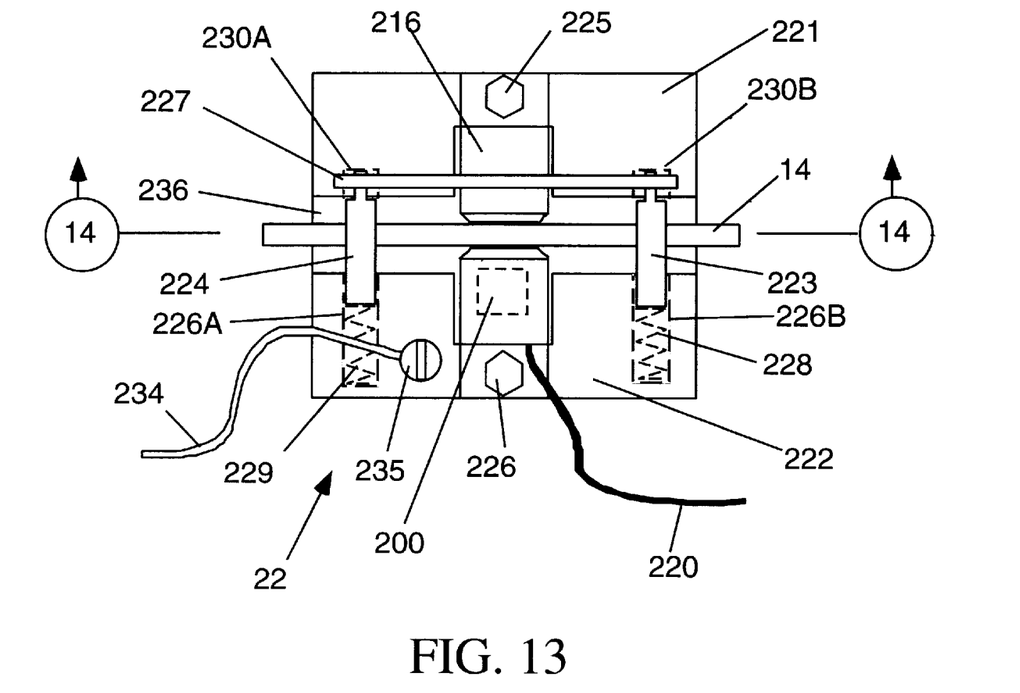
FIGS. 13 and 14 are plan and sectional elevation views of a second embodiment of a load sensor in accordance with the present invention.
Figure 14:
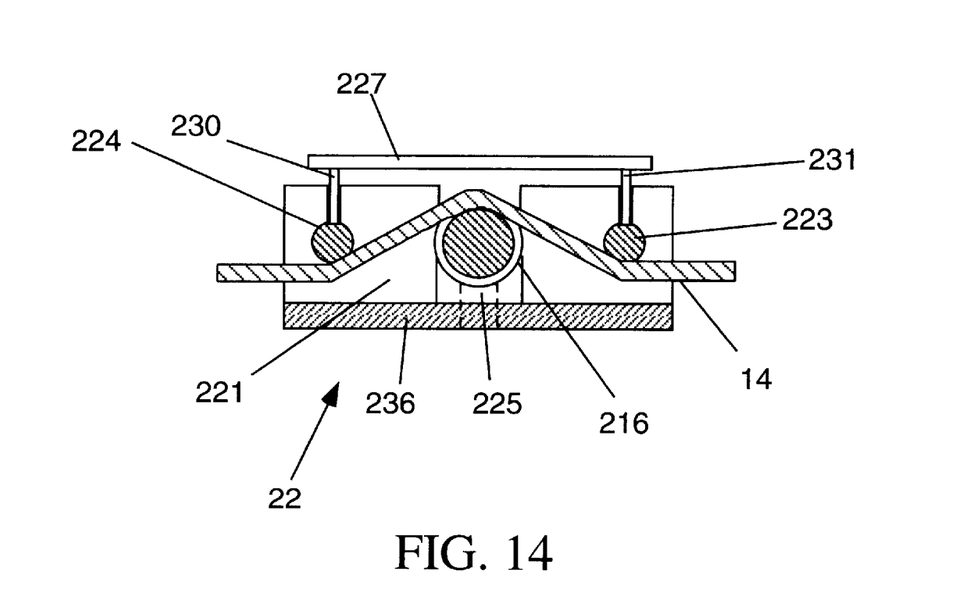

FIGS. 13 and 14 are plan and sectional elevation views, respectively of a second embodiment of rode load sensor 22 of FIG. 2. In this model load sensor 22 includes two body blocks 221 and 222, mounted on a base plate 236. A pair of retractable guides 223 and 224 are mounted in bores 226A and 226B on block 222 which contain retain springs 228 and 229. These springs force the pins into opposing holes on block 221. A retracting bar 227 connected to pins 223 and 224 via rods 230 and 231 operates pins 223 and 224 pushing them into the holes on block 222 allowing rode 14 to be placed over the cylindrical load cell 216 containing a strain gauge 200 and under pins 223 and 224. Load cell 216 is attached to the blocks 221 and 222 and the base 236 by bolts 225 and 226. The output signal from the strain gauge 200 is transferred to the computer through cable 220. Cable 234 is a security cable attached to the clip on model with screw 235 and to a point of convenience on ship 10 of FIG. 1.

Rode Load Sensor—Third Embodiment

Figure 15:
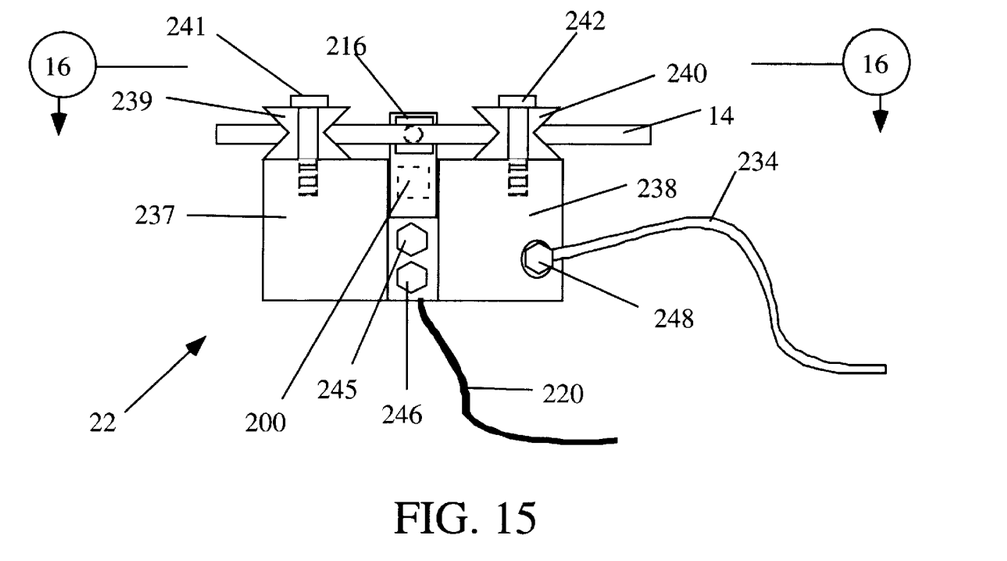
FIGS. 15 and 16 are plan and elevation views of a third embodiment of a rode load sensor in accordance with the present invention.
Figure 16:
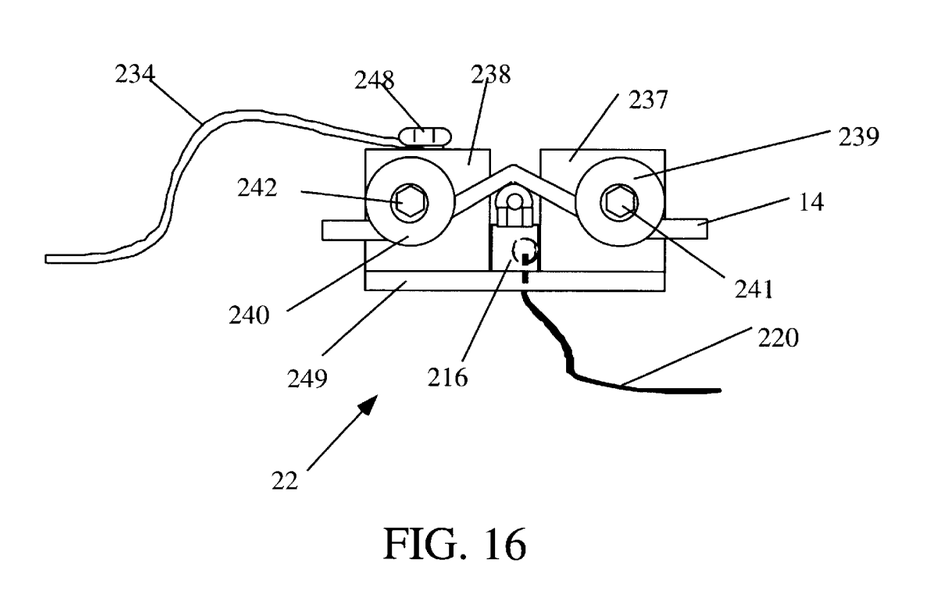

FIGS. 15 and 16 are plan and elevation views, respectively of a third embodiment of load sensor 22 of FIG. 2. In this model, load sensor 22 includes two body blocks 237 and 238, mounted on a base plate 249. A pair of pulleys 239 and 240 are mounted to blocks 237 and 238 with bolts 241 and 242. The load cell 216 is attached to the base plate 249 by bolts 245 and 246. The line is slipped under the pulleys 239 and 240 and over the load cell 216. The output signal from the strain gauge 200 is transferred to the computer through cable 220. Cable 234 is a security cable attached to the clip on model with screw 248 and to a point of convenience on ship 10 of FIG. 1.

Thus has been described an anchor monitoring system in accordance with the present invention that can determine when an anchor system has had either a catastrophic or dragging failure and which can provide a different alarm for each type of failure. The anchor monitoring system also computes rated rode tension based on rode type and diameter and signals an alarm when the rode load reaches a high percentage of rated rode load. The anchor monitoring system is easy to install and use, particularly since the rode load sensor does not have to be inserted into the rode or connected between the ship and the rode. Note that since the load sensor is not in line with the rode, the sensor itself does not bear the anchoring load and cannot itself cause an anchor system failure.

While the foregoing specification has described preferred embodiment(s) of the present invention, one skilled in the art may make many modifications to the preferred embodiment without departing from the invention in its broader aspects. For example, the anchor monitoring system of the present invention can be used without modification to monitor mooring lines and to alarm when mooring systems fail. Although dragging failures normally do not occur in mooring systems, catastrophic failure can occur when a mooring line or fittings attaching the mooring line to the ship or the moor break. The anchor monitoring system will also alarm when tension in the mooring line nears its rated strength. Those skilled in the art will appreciate that the load sensor described herein can also be used to monitor tensile loads in lines other than rodes and mooring lines. The appended claims therefore are intended to cover all such modifications as fall within the true scope and spirit of the invention.

What is claimed is:

1. An apparatus for signaling an alarm when an anchor system, including an anchor connected to a ship at sea via a rode, fails to hold the ship in place, the apparatus comprising:

a rode load sensor for producing a first output signal indicating rode load;

a wind velocity sensor for producing a second output signal indicating wind velocity; and monitoring and alarming means for monitoring said first and second output signals and for signaling said alarm in response to a combination of time varying behavior of wind velocity and rode load indicated by said first and second output signals.

2. The apparatus in accordance with claim 1 wherein said combination of time varying behavior of wind velocity and rode load indicated by said first and second output signals is symptomatic of a dragging anchor.

3. The apparatus in accordance with claim 2 wherein said monitoring and alarming means signals said alarm when said first and second output signals indicate that said wind velocity is trending upward while said rode load is trending downward.

4. The apparatus in accordance with claim 3 wherein said monitoring and alarming means continuously processes said first output signal to determine therefrom a dampened rode load, continuously processes said second output signal to determine therefrom a dampened wind velocity, and signals said dragging failure alarm when the determined dampened rode load decreases by at least a predetermined amount during a time when the determined dampened velocity increases.

5. The apparatus in accordance with claim 1 wherein said combination of time varying behavior of wind velocity and rode load indicated by said first and second output signals is symptomatic of a catastrophic anchor system failure.

6. The apparatus in accordance with claim 5 wherein combination of time varying behavior of wind velocity and rode load includes said rode load rising above an alert load and thereafter falling below a predetermined catastrophic alarm load.

7. The apparatus in accordance with claim 6 wherein said alert load is provided as data input to said monitoring and alarming means.

8. The apparatus in accordance with claim 7 wherein said monitoring and alarming means computes said catastrophic alarm load in response to wind velocity and rode load information conveyed by said first and second output signals.

9. The apparatus in accordance with claim 7 further comprising a wind direction sensor for producing a third output signal indicating wind direction relative to a fixed axis of said ship, wherein said monitoring and alarming means also monitors said third output signal and signals said alarm in response to a combination of time varying behavior of wind velocity and rode load and wind direction indicated by said first, second and third output signals.

10. The apparatus in accordance with claim 9 wherein said monitoring and alarming means computes a wind resistance factor for said ship as a function of wind direction relative to said ship in response to said first, second and third output signals, and employs said wind resistance factor when computing said catastrophic alarm load.

11. The apparatus in accordance with claim 1 wherein said rode load sensor comprises a load cell applying a force on said rode so as to deflect said rode from a straight path and for generating an output signal proportional to an amount of strain produced in said load cell when applying said force.

12. The apparatus in accordance with claim 11 wherein said rode load sensor further comprises:

a frame for holding said load cell, two members mounted on said frame spaced apart and positioned with respect to said load cell and said rode such that said rode contacts said two members and such that said load cell deflects said rode from following said straight path between said two members.

13. A method for signaling an alarm when an anchor system, including an anchor connected to a ship at sea via a rode, fails to hold the ship in place, the method comprising the steps of:

monitoring rode load;

monitoring wind velocity; and signaling said alarm in response to a combination of time varying behavior of monitored wind velocity and rode load that is indicative of an anchor system failure.

14. The method in accordance with claim 13 wherein said step of signal said alarm comprises the substeps of:

continuously computing a dampened rode load;

continuously computing a dampened wind velocity; and signaling said alarm when said dampened wind velocity is trending upward during a time when said dampened rode load is trending downward.

15. The method in accordance with claim 13 wherein said combination of time varying behavior of monitored wind velocity and rode load is symptomatic of a catastrophic anchor system failure.

16. The method in accordance with claim 15 wherein combination of time varying behavior of monitored wind velocity and rode load includes said rode load rising above an alert load and thereafter falling below a predetermined catastrophic alarm load.

17. The method in accordance with claim 13 wherein the step of monitoring said rode load comprises the substep of positioning a load cell including a strain gauge to deflect said rode from a straight path between two points such that said strain gauge produces an output signal indicative of said tensile forces.

18. An apparatus for signaling an alarm when an anchor system, including an anchor connected to a ship at sea via a rode, fails to hold the ship in place, the apparatus comprising:

a rode load sensor for producing a first output signal indicating rode load;

a wind velocity sensor for producing a second output signal indicating wind velocity; and a current velocity sensor for producing a third output signal indicating current velocity;

monitoring and alarming means for monitoring said first and second output signals and for signaling said alarm in response to a combination of time varying behavior of wind velocity, current velocity and rode load indicated by said first, second and third output signals.

19. The apparatus in accordance with claim 18 wherein said combination of time varying behavior of wind velocity, current velocity and rode load indicated by said first, second and third output signals is symptomatic of a dragging anchor.

20. The apparatus in accordance with claim 19 wherein said monitoring and alarming means signals said alarm when said first, second and third output signals indicate that a static force on said ship produced by a combination of wind velocity and current velocity is trending upward while said rode load is trending downward.

21. The apparatus in accordance with claim 20 wherein said monitoring and alarming means continuously processes said first output signal to determine therefrom a dampened rode load, continuously processes said second signal to determine therefrom a dampened wind velocity, continuously processes said third signal to determine therefrom a dampened current velocity, determines said static force from a combination of said dampened wind velocity and said time-dampened current velocity, and signals said dragging failure alarm when the determined dampened rode load decreases by at least a predetermined amount during a time when the determined static force increases.

22. The apparatus in accordance with claim 18 wherein said combination of time varying behavior of wind velocity, current velocity and rode load indicated by said first, second and third output signals is symptomatic of a catastrophic anchor system failure.

23. The apparatus in accordance with claim 22 wherein combination of time varying behavior of wind velocity, current velocity, and rode load includes said rode load rising above an alert load and thereafter falling below a predetermined catastrophic alarm load.

24. The apparatus in accordance with claim 23 wherein said alert load is provided as data input to said monitoring and alarming means.

25. The apparatus in accordance with claim 24 wherein said monitoring and alarming means computes said catastrophic alarm load in response to wind velocity, current velocity and rode load information conveyed by said first, second and third output signals.

26. The apparatus in accordance with claim 24 further comprising a wind direction sensor for producing a fourth output signal indicating wind direction relative to fixed axis of said ship, wherein said monitoring and alarming means also monitors said fourth output signal and signals said alarm in response to a combination of time varying behavior of wind velocity, current velocity, rode load, and wind direction indicated by said first, second, third and fourth output signals.

27. The apparatus in accordance with claim 25 wherein said monitoring and alarming means computes a wind resistance factor for said ship as a function of wind direction relative to said ship in response to said first, second, third and fourth output signals, and employs said wind resistance factor when computing said catastrophic alarm load.

28. The apparatus in accordance with claim 18 wherein said rode load sensor comprises a load cell applying a lateral force on said rode so as to laterally deflect said rode from a straight path and for generating an output signal proportional to an amount of strain produced in said load cell when applying said lateral force.

29. An apparatus for signaling an alarm when an anchor system, including an anchor connected to a ship at sea via a rode, fails to hold the ship in place in a current, the apparatus comprising:

a rode load sensor for producing a first output signal indicating rode load;

a current velocity sensor for producing a second output signal indicating current velocity; and monitoring and alarming means for monitoring said first and second output signals and for signaling said alarm in response to a combination of time varying behavior of current velocity and rode load indicated by said first and second output signals.

30. The apparatus in accordance with claim 29 wherein combination of time varying behavior of wind velocity and rode load includes said rode load rising above an alert load and thereafter falling below a predetermined catastrophic alarm load.

31. The apparatus in accordance with claim 30 wherein said monitoring and alarming means computes said catastrophic alarm load in response to current velocity and rode load information conveyed by said first and second output signals.

32. The apparatus in accordance with claim 31 wherein said monitoring and alarming means computes a current resistance factor for said ship in response to said first and second output signals, and employs said current resistance factor when computing said catastrophic alarm load.

33. An apparatus for signaling an alarm when a mooring line fails to hold a ship in place, the apparatus comprising:
- a mooring line load sensor for producing a first output signal indicating a load on said mooring line;
- a wind velocity sensor for producing a second output signal indicating wind velocity; and
- monitoring and alarming means for monitoring said first and second output signals and for signaling said alarm in response to a combination of time varying behavior of wind velocity and load indicated by said first and second output signals.

34. The apparatus in accordance with claim 33 wherein said combination of time varying behavior of wind velocity and rode load indicated by said first and second output signals is symptomatic of a catastrophic failure of said mooring line.

* * * * *